United States Patent [19]

Feitelson

[11] Patent Number: 4,548,160

[45] Date of Patent: Oct. 22, 1985

[54] CAT LITTER BOX

[76] Inventor: Ira S. Feitelson, 315 Mission St. SE., Salem, Oreg. 97302

[21] Appl. No.: 436,782

[22] Filed: Oct. 26, 1982

[51] Int. Cl.⁴ .................. B65D 5/22; A01K 23/00
[52] U.S. Cl. ..................................... 119/1; 229/34 R
[58] Field of Search ............... 119/1; 229/34 B, 34 R, 229/31 FS, 16 R, 35, 32, 33

[56] References Cited

U.S. PATENT DOCUMENTS

| | | | |
|---|---|---|---|
| 4,164,314 | 8/1979 | Edgar | 119/1 |
| 4,304,329 | 12/1981 | Graser | 229/31 FS |
| 4,305,544 | 12/1981 | Noonan | 119/1 |
| 4,343,428 | 8/1982 | Persson | 229/31 FS |

FOREIGN PATENT DOCUMENTS 2345698  7/1974  Fed. Rep. of Germany .......... 119/1

Primary Examiner—Hugh R. Chamblee
Attorney, Agent, or Firm—Charles N. Hilke

[57] ABSTRACT

A disposable cat litter box including a horizontally extending bottom preferably rectangular and attached along the ends to upwardly extending end walls and side walls which each may be further folded to provide a top cover of one-half the area of the horizontally extending bottom. Furthermore the upwardly extending side walls and end walls may be further folded and through the use of tabs and slots form angled sides.

The disposable cat litter box contains litter and is sealed. Upon opening, the cat litter box may easily be formed into an open-top moisture resistant box. After use, the biodegradable cat litter box may be resealed and disposed.

13 Claims, 10 Drawing Figures

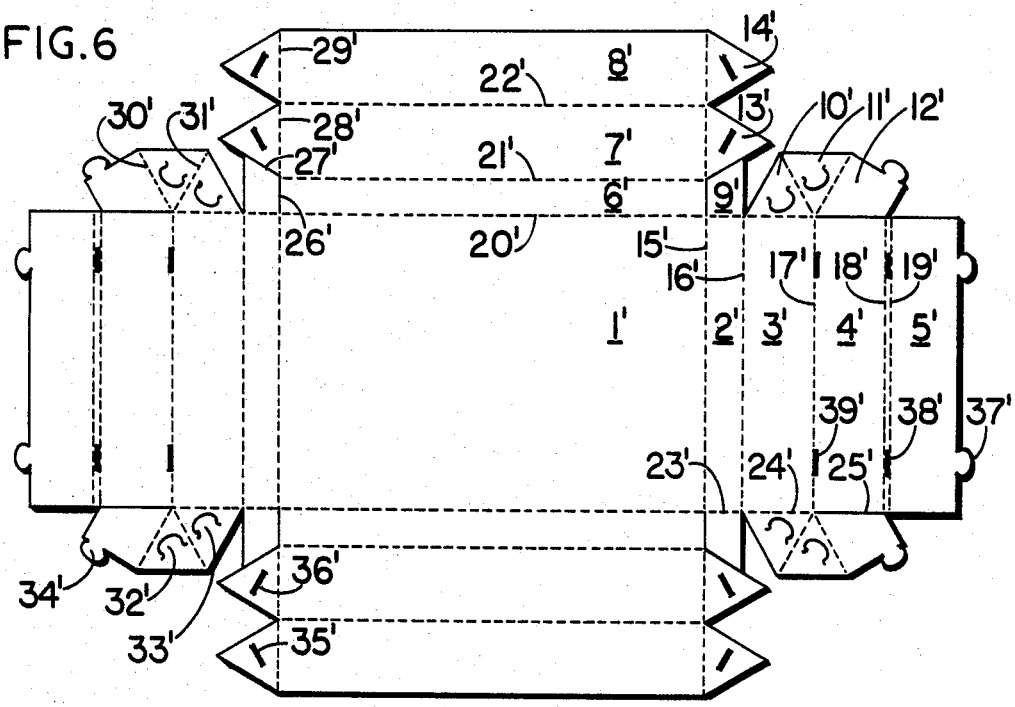
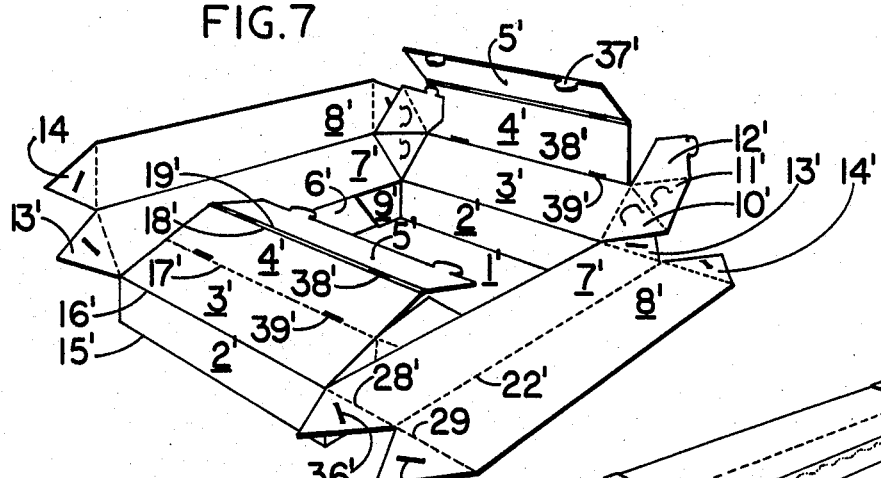
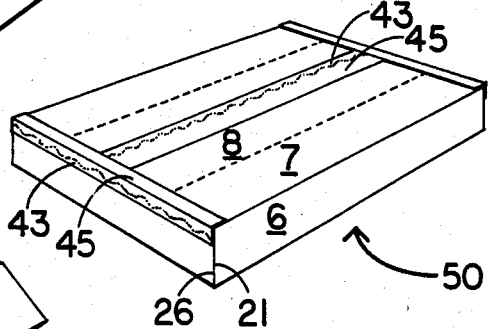
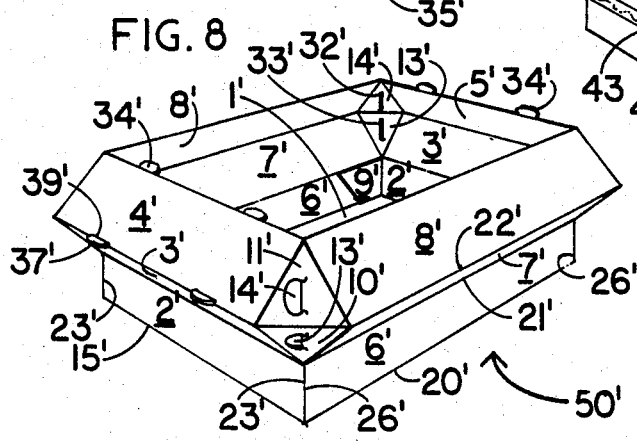

CAT LITTER BOX

BACKGROUND OF THE INVENTION

1. Field of the Invention

The present invention deals with the field of cat litter boxes or other types of holding devices.

2. Description of the Prior Art

Previous cartons or other boxes have been designed for various purposes, for example, U.S. Pat. No. 2,148,048.

In the specific area of cat litter boxes various techniques and designs have been used in the past. Usually, hard plastic litter boxes filled with litter are used and then the litter is discarded and the litter box cleaned and refilled with new litter. Of course, disposable means have been tried: boxes with disposable trays, U.S. Pat. No. 4,171,680; boxes with screens on flexible sieve sheets, U.S. Pat. No. 4,312,295; folding boxes with litter to be spread within the box when opened, U.S. Pat. Nos. 3,154,052, 3,581,975, and 3,743,170; and boxes with disposable plastic liners, U.S. Pat. No. 3,684,155.

Each of these techniques has disadvantages. Cleaning the hard plastic litter boxes is a disagreeable task. Removeable trays are spilled. The use of screens or flexible sieve sheets to strain the litter for waste is a disagreeable task. Spreading the litter in a box then moving the litter to one side of the box for refolding and disposal is a disagreeable task. Plastic liners sometimes break.

SUMMARY OF THE INVENTION

The invention is based upon several distinct features. The litter is contained within the sealed cat litter box. In this form, the cat litter box comprises a bottom s means which is preferably rectangular and extends horizontally to define an upper bottom surface for holding cat litter. End walls and side walls extend upwardly from the bottom s means. The end walls and side walls are further folded horizontally to provide a top s means which is sealed.

To use, the top s means is unsealed and folded and secured by slots and tabs to form extended side walls and end walls in a configuration angled to minimize the scatter of cat litter.

After use and to dispose, the upwardly angled side walls and end walls are unfolded and repositioned horizontally reforming a top s means. The top s means is resealed and the used cat litter box is disposed.

OBJECTS OF THE INVENTION

It is an object of the invention to provide an inexpensive disposable cat litter box which is easy to open, use, seal and dispose. A further object is to provide a clean cat litter box without the necessity of arranging or moving litter. Another further object is to provide moisture resistant material which is biodegradable in the construction of the cat litter box. Slanted side walls which reflect material into the bottom of the cat litter box and double material covering on the top of the closed litter box are additional objects. Other objects will be apparent from the following description and claims.

BRIEF DESCRIPTION OF THE DRAWINGS

FIG. 5 is a perspective view of the invention folded and closed.

FIG. 6 shows a top view of another embodiment of the invention unfolded.

FIG. 7 shows a perspective view of another embodiment of the invention partially folded and opened.

FIG. 8 shows a perspective view of another embodiment of the invention fully folded and opened.

DETAILED DESCRIPTION OF THE PREFERRED EMBODIMENTS

Figure 1:
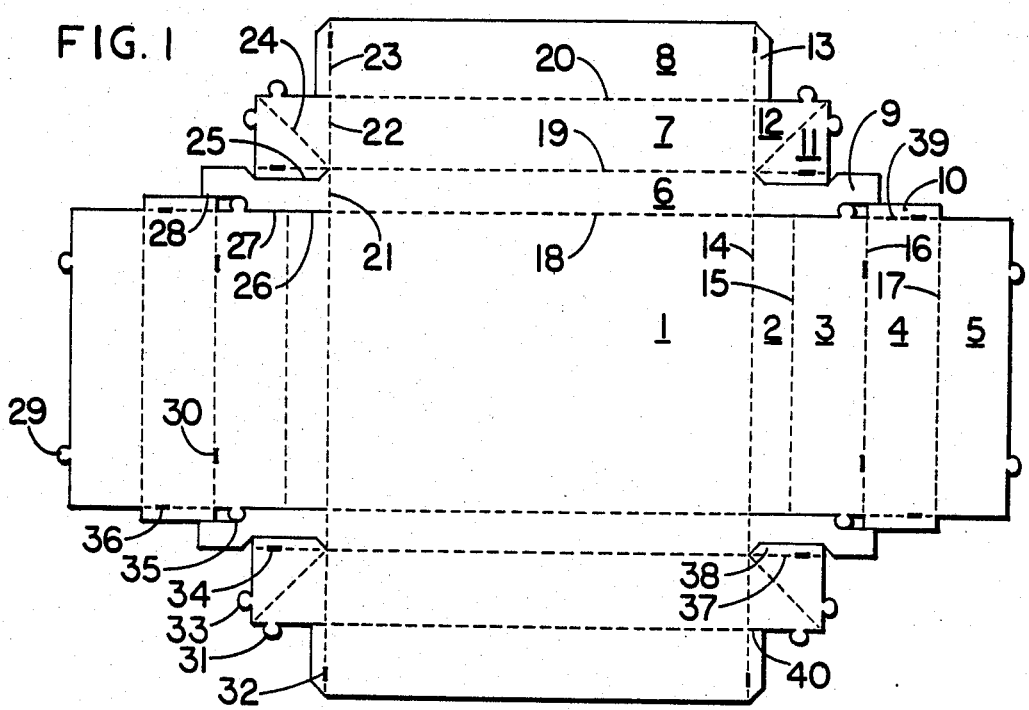
FIG. 1 shows a top view of one embodiment of the invention unfolded.
Figure 2:
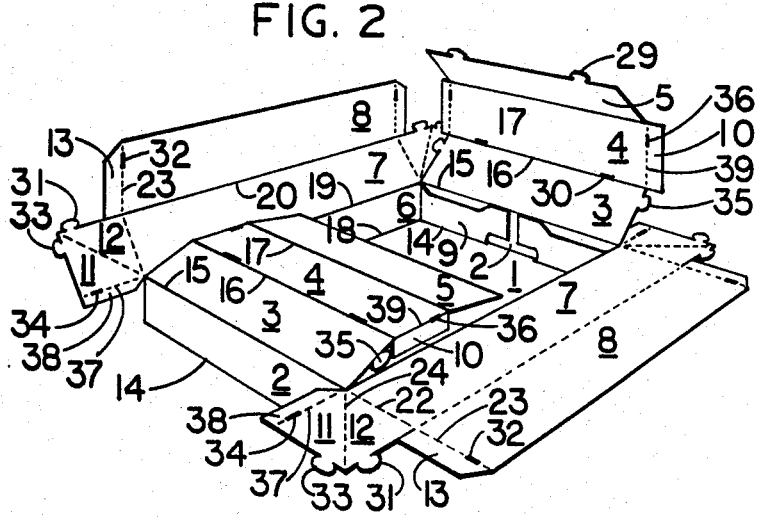
FIG. 2 shows a perspective view of one embodiment of the invention partially folded and opened.
Figure 4:
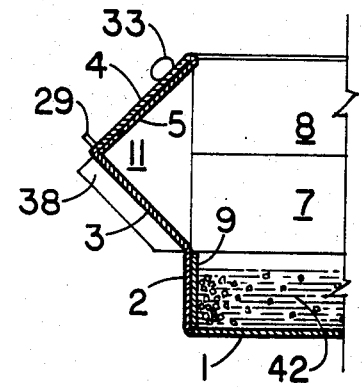
FIG. 4 is a sectional view along lines 4—4 of FIG. 3.
Figure 3:
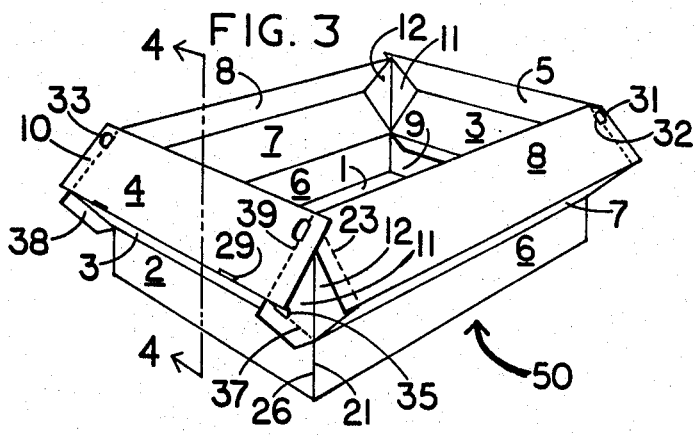
FIG. 3 shows a perspective view of one embodiment of the invention fully folded and opened.
Figure 9:
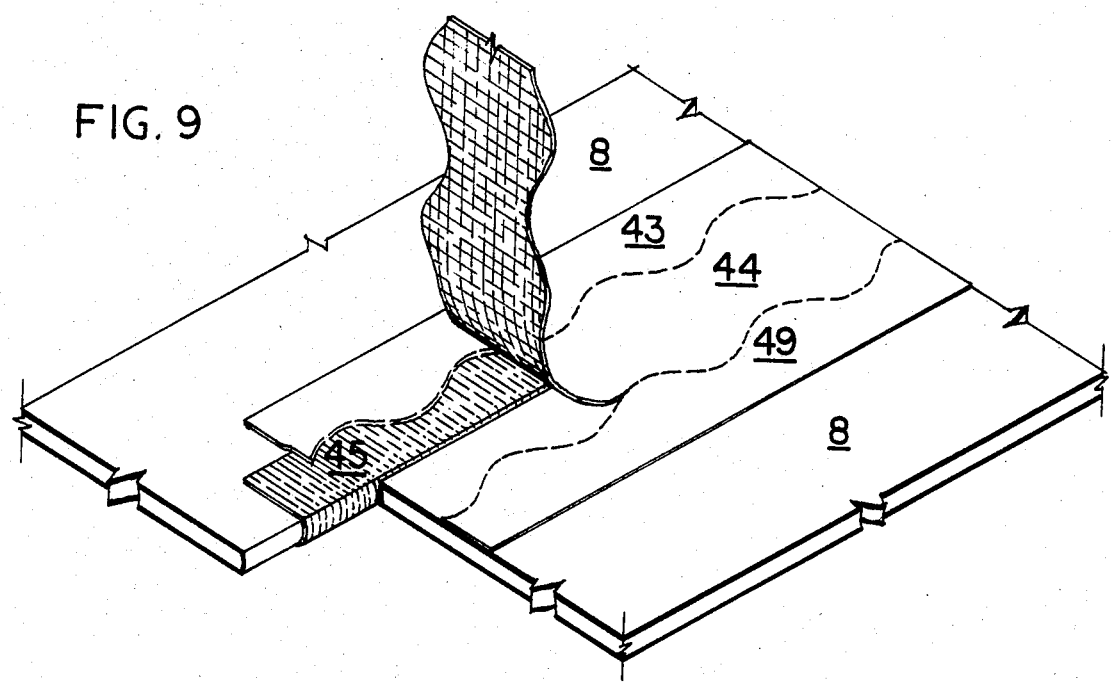
FIG. 9 shows a perspective view opening the sealed, folded and closed invention.
Figure 10:
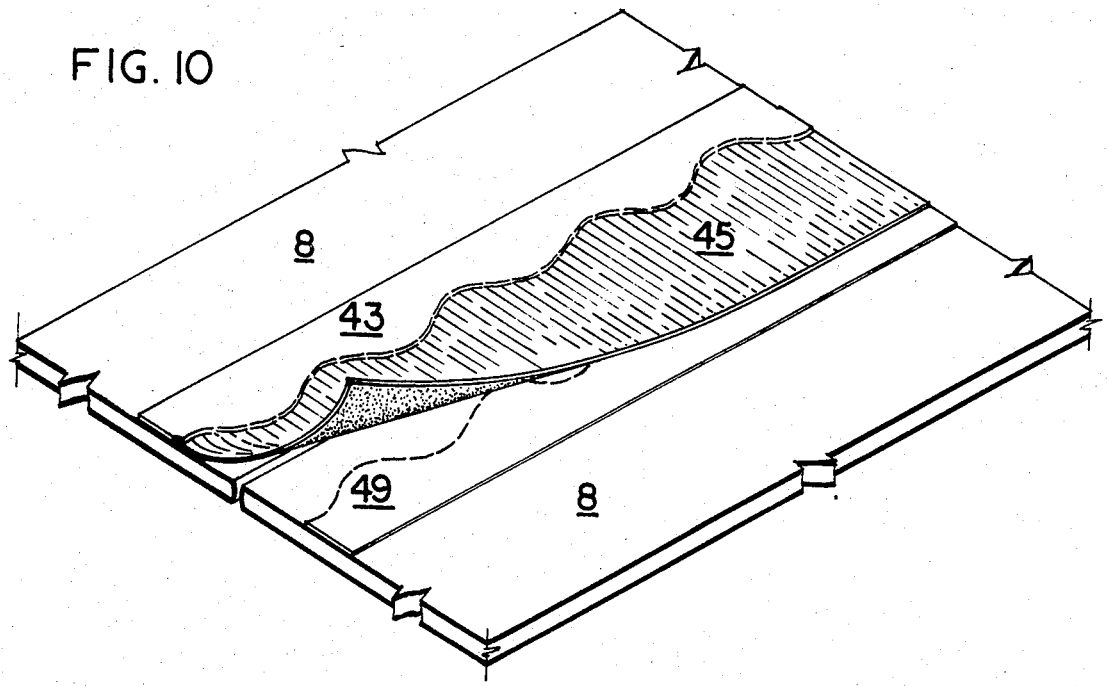
FIG. 10 shows a perspective view sealing the folded and closed invention.

The present invention provides a disposable, biodegradable cat litter box 50 which contains cat litter 42 for use by domestic house pets preferably cats. Referring to FIGS. 1, 2, 3, 4, 5, 9 and 10, a horizontal bottom s means 1 by folding creases 14 forms upwardly extending vertical end walls 2 and by folding creases 18 forms upwardly extending vertical side walls 6. Braces 9 after folding along creases 21 fit flush against end walls 2 and perpendicular to side walls 6. Note that braces 9 fold about crease 21 only by means of cuts 25, 26, 27 and 28. Cat litter 42 is placed within the volume formed by bottom s means 1, end walls 2, and side walls 6. Upper end surfaces 10 are folded perpendicularly along creases 39 to fit flush against side walls 6. By folding creases 15 the outwardly angled end s means 3, inwardly angled end s means 4, and downwardly angled end s means 5 fit horizontally on the top of the cat litter 42. Upper side surfaces 13 after folding along creases 23 fit flush against inwardly angled side means 8. Note cut 40 separates upper side surfaces 13 from side corner s means 12. End corner surfaces 38 are folded along creases 37 to fit flush against end corner s means 11. Side corner s means 12 and end corner s means 11 are folded along creases 22 to fit flush against outwardly angled side s means 7. By folding creases 19 the outwardly angled side s means 7 and the inwardly angled side s means 8 fit horizontally on the outwardly angled end s means 3, the inwardly angled end s means 4, and the downwardly angled end s means 5. Anchor tape means 43, removeable tape means 44, resealing tape 45, and remainder tab s means 49 are by glue or other suitable means attached to the adjacent edges of the horizontally positioned inwardly angled side s means 8 and attached to the outwardly angled side s means 7 along creases 22 and the inwardly angled side s means 7 along creases 23, and the upwardly extending end wall s means 2 along creases 15. Thus the cat litter box 50 is sealed with the cat litter 42 inside.

To use, the removeable tape s means 44 are separated from the anchor tape s means 43 and the remainder tape s means 49. The cat litter box 50 is easily opened by unfolding along creases 19 and 15. By appropriately folding creases 19 and 20, 15 and 16, and 24 and 22, the side corner s means 12 with the side corner tab s means 31 are positioned to be fitted into the side corner slot s means 32; the end corner s means 11 with the end corner tab s means 33 are positioned to be fitted into the end corner slot s means 36; and the side tab s means 35 are positioned to be fitted into the side slot s means 34. This causes outwardly angled end s means 3 and outwardly angled side s means 7 to be disposed outwardly angularly from the end walls 2 and the side walls 6, respectively. Also, the inwardly angled end s means 4 and the inwardly angled side means 8 are disposed inwardly angularly. Downwardly angled end s means 5 are folded along creases 17 so that end tab s means 29 fit through end slot s means 30. Note that inwardly angled end s means 4 is now flush against downwardly angled end s means 5. As is seen best in FIG. 3, the outwardly angled end s means 3, the inwardly angled end s means 4 with the flush downwardly angled end s means 5, the outwardly angled side s means 7, and the inwardly angled side s means 8 form a deflector of cat litter 42 back into the cat litter box 50. The cat litter box 50 is opened and ready for use.

To dispose, reverse the steps followed in the use description. The side tab s means 35 are taken out of side slot s means 34; the end corner tab s means 33 are removed from end corner slot s means 36; and the side corner tab s means 31 are removed from the side corner slot s means 32. The creases 22, 24, 16, 15, 20 and 19 are unfolded. End tab s means 29 are removed from end slot s means 30. Crease 17 is unfolded. Again upper end surfaces 10 are folded along creases 39 to fit flush against inwardly angled s means 4. Creases 15 are folded so that outwardly angled end s means 3, inwardly angled end s means 4, and downwardly angled end means 5 are positioned horizontally on the top of the used cat litter 42. Note that the widths of inwardly angled end s means 4, downwardly angled end s means 5, and outwardly angled end s means 3 can be made equal to one another and, in combination, equal to one-half the length of the bottom s means 1. End corner surfaces 38 are folded along crease 37 to fit flush against the end corner s means 11. By folding creases 22, the end corner s means 11 with the end corner surfaces 38 and the side corner means 12 fit flush against outwardly angled side s means 7. Upper side surfaces 13 are folded along creases 23 to fit flush against inwardly angled side s means 8. By folding creases 19 the outwardly angled side s means 7 and the inwardly angled side s means 8 extend horizontally over the outwardly angled end s means 3, the inwardly angled end s means 4, and the downwardly angled end s means 5. Note that the edges of inwardly angled side s means 8 are adjacent. This requires that the widths of inwardly angled side s means 8 and of outwardly angled side s means 7, in combination, must equal one-half of the width of bottom s means 1. Resealing tape 45 is then used to seal each edge of the inwardly angled side s means 8 and to seal the upwardly extending end wall s means 2 along creases 15 to the inwardly angled side s means 8 along creases 23 and to the outwardly angled side s means 7 along creases 22. The cat litter box 50 is ready for disposal as shown in FIG. 5.

In another embodiment of the invention, shown in FIGS. 6, 7, and 8, a bottom s means 1' by folding creases 15' forms upwardly extending end walls 2' and by folding creases 20' forms upwardly extending side walls 6'. Braces 9' after folding along creases 23' fit flush against side walls 6' and perpendicular to end walls 2'. Note that braces 9' fold about creases 23' only by means of cuts 26' and 27'. Upper side surfaces 12', by means of cut 25' upwardly end corner 11', and downwardly end corner 10' are folded on crease 24' in order to lie flush against outwardly angled end s means 3' and inwardly angled end s means 4'. By folding creases 16' the outwardly angled end s means 3', the inwardly angled end s means 4', and the downwardly angled end s means 5' extend horizontally on top of the cat litter. Downwardly side corner 13' is folded along creases 28' in order to fit flush against the outwardly angled side s means 7'. The upwardly side corner 14' are folded along creases 29' to fit flush against inwardly angled side s means 8'. By folding along crease 21' the outwardly angled side s means 7' and the inwardly angled side s means 8' extend horizontally and rest upon the outwardly angled end s means 3', the inwardly angled end s means 4', and the downwardly angled end s means 5'. As previously discussed in the first embodiment tape s means (not shown) are used to seal the cat litter box 50'.

To use, the cat litter box 50' is unsealed as previously described in the first embodiment. The cat litter box 50' is easily opened by unfolding along creases 16' and 21'. By folding creases 24', 31', and 30' the upper side surface 12' is brought into contact with the inwardly angled end s means 4' so that the upper side surface tab s means 34' fits into the restraining slot s means 38'. Now folding creases 18' and 19' the end tab s means 37' fit into the end slot s means 39'. Thus, downwardly angled end s means 5' fits flush against inwardly angled end s means 4'. Note that cut 25 frees upper side surface 12' so that it folds only about crease 30'. Further folding of creases 17' and 16', and creases 21' and 22' the downwardly side corner 13' and the downwardly end corner 10' are positioned so that downwardly end corner tab s means 33' fits through downwardly side corner slot s means 36'. In addition, upwardly end corner 11' and upwardly side corner 14' are in position so that upwardly end corner tab s means 32' fits into upwardly side corner slot s means 35'. Note that downwardly side corner 13' and upwardly side corner 14' are inside the cat litter box 50'. While upwardly end corner 11' and downwardly end corner 10' are on the outside of the cat litter box 50'. Furthermore: Downwardly end corner 10', upwardly end corner 11', downwardly side corner 13', and upwardly side corner 14' are all equilateral triangles of the same dimension. As can be seen by those experienced in the art, the positioning of the upper side surface tab s means 34' with the positioning of restraining slot s means 38' in conjunction with the positioning of upwardly end corner tab s means 32' and downwardly end corner tab s means 33' provides increased strength against any attempts to pull apart the cat litter box 50'. Thus, the cat litter box 50' is opened and ready for use.

To dispose, reverse the steps followed in the use description. The resealing of the box for disposal is accomplished as described in the first embodiment. As in the first embodiment, the edges of the inwardly angled side s means 8' are adjacent. This requires that the widths of inwardly angled side s means 8' and of outwardly angled side s means 7', in combination, must equal ½ of the width of bottom s means 1'. Again, as in the first embodiment, it is preferred that the widths of inwardly angled end s means 4', downwardly angled end s means 5' and outwardly angled end s means 3' are made equal to one another and, in combination, equal to ½ the length of the bottom s means 1.

While in the foregoing specification embodiments of the present invention have been set forth in considerable detail for the purposes of making a complete disclosure of the invention, it will be apparent to those of ordinary skill in the art that numerous changes may be made in such details without departing from the spirit and principles of the invention.

I claim:

1. A disposable cat litter box comprising:
   (a) a bottom extending horizontally upon which cat litter may be placed;
   (b) end walls secured to and adapted to extend vertically from said bottom;
   (c) side walls secured to and adopted to extend vertically from said bottom;
   (d) outwardly angled ends secured to said end walls and adapted to extend angularly to said end walls;
   (e) inwardly angled ends secured to and adapted to extend angularly to said outwardly angled ends;
   (f) downwardly angled ends secured to and adapted to extend flush with said inwardly angled ends;
   (g) means for locking said downwardly angled ends flush against said inwardly angled ends;
   (h) outwardly angled sides secured to said side walls and adapted to extend angularly to said side walls;
   (i) inwardly angled sides secured to and adapted to extend angularly to said outwardly angled sides;
   (j) means for securing said inwardly angled sides and said outwardly angled sides to said outwardly angled ends, said inwardly angled ends, and said downwardly angled ends;
   (k) means for sealing adjacent inwardly angled sides;
   (l) means for unsealing adjacent inwardly angled sides; and
   (m) means for resealing adjacent inwardly angled sides.

2. The disposable cat litter box as defined in claim 1 wherein said means for locking downwardly angled ends flush against said inwardly angled ends comprises end tabs interconnect with end slots.

3. The disposable cat litter box as defined in claim 1 wherein said means for sealing adjacent inwardly angled sides comprise, in combination, anchor tape on one adjacent inwardly angled side, removeable tape attached to anchor tape and remainder tape, and remainder tape on the other adjacent inwardly angled side.

4. The disposable cat litter box as defined in claim 1 wherein said means for unsealing adjacent inwardly angled sides comprises separating the removeable tape from the anchor tape and the remainder tape.

5. The disposable cat litter box as defined in claim 1 wherein said means for resealing adjacent inwardly angled sides comprises resealing tape located under anchor tape on one adjacent inwardly angled side and fastened over remainder tape on the other adjacent inwardly angled side.

6. The disposable cat litter box as defined in claim 1 wherein said means for securing said inwardly angled sides and said outwardly angled sides to said outwardly angled ends, said inwardly angled ends, and said downwardly angled ends comprises:
   (n) braces secured to said side walls and adapted to extend perpendicular to said side walls;
   (o) upper end surfaces secured to inwardly angled ends and adapted to extend perpendicular to said inwardly angled ends;
   (p) side corners secured to outwardly angled sides and adapted to extend flush to said outwardly angled sides;
   (q) end corners secured to said side corners and adapted to extend angularly to said side corners;
   (r) end corner surfaces secured to said end corners and adapted to extend flush to said end corners;
   (s) upper side surfaces secured to inwardly angled sides and adapted to extend flush to said inwardly angled sides;
   (t) side corner tabs secured to side corners which interconnect with side corner slots located between the inwardly angled sides and the upper side surfaces;
   (u) end corner tabs secured to end corners which interconnect with end corner slots located between inwardly angled ends and upper end surface; and
   (w) side tab secured to outwardly angled ends which interconnect with side slots located between end corners and end corner surfaces.

7. The disposable cat litter box as defined in claim 1 wherein said cat litter box is made of biodegradeable material.

8. The disposable cat litter box as defined in claim 1 wherein said outwardly angled ends, inwardly angled ends, and downwardly angled ends, in combination, equal the length of said bottom.

9. The disposable cat litter box as defined in claim 1 wherein said outwardly angled sides and inwardly angled sides, in combination, equal the width of said bottom.

10. The disposable cat litter box as defined in claim 1 wherein said means for securing said inwardly angled sides and said outwardly angled sides to said outwardly angled ends, said inwardly angled ends, and said downwardly angled ends comprises:
    (i) braces secured to said end walls and adapted to extend perpendicular to said end walls;
    (ii) downwardly end corners secured to outwardly angled ends and adapted to fit flush to said outwardly angled ends;
    (iii) upwardly end corners secured to downwardly end corners and adapted to extend angularly to said downwardly end corners;
    (iv) upper side surfaces secured to upwardly end corners and adapted to extend angularly to said upwardly end corners;
    (v) downwardly side corners secured to outwardly angled sides and adapted to fit flush to said outwardly angled sides;
    (vi) upwardly side corners secured to inwardly angled sides and adapted to fit flush to said inwardly angled sides;
    (vii) upper side surface tabs secured to upper side surfaces which interconnect with restraining slots located between downwardly angled ends and inwardly angled ends;
    (viii) upwardly end corner tabs secured to upwardly end corners which interconnected with upwardly side corner slots located on upwardly side corners; and
    (ix) downwardly end corner tabs secured to downwardly end corners which interconnect with downwardly side corner slots located on downwardly side corners.

11. The disposable cat litter box as defined in claim 10 wherein said downwardly end corner, upwardly end corner, downwardly side corner, and upwardly side corner are congruent equilateral triangles.

12. A disposable cat litter box comprising:
    (a) a bottom extending horizontally upon which cat litter may be placed;
    (b) end walls secured to and adapted to extend vertically from said bottom;

(c) side walls secured to and adopted to extend vertically from said bottom;
(d) outwardly angled ends secured to said end walls and adapted to extend horizontally parallel to said bottom;
(e) inwardly angled ends secured to said outwardly angled ends and adapted to extend horizontally parallel to said bottom;
(f) downwardly angled ends secured to said inwardly angled ends and adapted to extend horizontally parallel to said bottom;
(g) where said outwardly angled ends, said inwardly angled ends, and said downwardly angled ends, in combination, equal the length of said bottom;
(h) outwardly angled sides secured to said side walls and adapted to extend horizontally parallel to said bottom;
(i) inwardly angled sides secured to said outwardly angled sides and adapted to extend horizontally parallel to said bottom;
(j) where said outwardly angled sides and said inwardly angled sides, in combination, equal the width of said bottom;
(k) means for sealing adjacent inwardly angled sides;
(l) means for unsealing adjacent inwardly angled sides; and
(m) means for resealing adjacent inwardly angled sides.

13. A disposable cat litter box comprising:
(a) a bottom means extending horizontally upon which cat litter may be placed;
(b) end walls secured to and adapted to extend vertically from said bottom;
(c) side walls secured to and adopted to extend vertically from said bottom;
(d) outwardly angled ends secured to said end walls and adapted to extend horizontally parallel to said bottom;
(e) inwardly angled ends secured to said outwardly angled ends and adapted to extend horizontally parallel to said bottom;
(f) downwardly angled ends secured to said inwardly angled ends and adapted to extend horizontally parallel to said bottom;
(g) where said outwardly angled ends, said inwardly angled ends, and said downwardly angled ends, in combination, equal the length of said bottom;
(h) outwardly angled sides secured to said side walls and adapted to extend horizontally parallel to said bottom;
(i) inwardly angled sides secured to said outwardly angled sides and adapted to extend horizontally parallel to said bottom;
(j) where said outwardly angled sides and said inwardly angled sides, in combination, equal the width of said bottom; and
(m) means for resealing adjacent inwardly angled sides.

* * * * *